(12) United States Patent
Keohane et al.

(10) Patent No.: US 7,836,261 B2
(45) Date of Patent: Nov. 16, 2010

(54) MANAGING CACHING OF DATA ON A CLIENT

(75) Inventors: Susann Marie Keohane, Austin, TX (US); Gerald Francis McBrearty, Austin, TX (US); Johnny Meng-Han Shieh, Austin, TX (US); Shawn Patrick Mullen, Buda, TX (US); Jessica Kelley Murillo, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 10/755,820

(22) Filed: Jan. 12, 2004

(65) Prior Publication Data

US 2005/0154837 A1    Jul. 14, 2005

(51) Int. Cl.
*G06F 12/00* (2006.01)

(52) U.S. Cl. .............................. 711/139; 711/E12.021; 709/219

(58) Field of Classification Search ........................ None
See application file for complete search history.

(56) References Cited

U.S. PATENT DOCUMENTS

| | | | |
|---|---|---|---|
| 6,094,662 A | 7/2000 | Hawes | 707/104 |
| 6,385,642 B1 * | 5/2002 | Chlan et al. | 709/203 |
| 6,397,301 B1 | 5/2002 | Quach et al. | 711/138 |
| 6,457,047 B1 * | 9/2002 | Chandra et al. | 709/217 |
| 6,460,060 B1 | 10/2002 | Maddalozzo, Jr. et al. | 707/513 |
| 6,496,902 B1 * | 12/2002 | Faanes et al. | 711/118 |
| 6,502,213 B1 * | 12/2002 | Bowman-Amuah | 714/49 |
| 6,510,458 B1 * | 1/2003 | Berstis et al. | 709/219 |
| 6,965,968 B1 * | 11/2005 | Touboul | 711/118 |
| 2002/0069365 A1 | 6/2002 | Howard et al. | 713/201 |
| 2002/0099850 A1 | 7/2002 | Farber et al. | 709/245 |
| 2002/0198956 A1 | 12/2002 | Dunshea et al. | 709/214 |
| 2003/0070005 A1 | 4/2003 | Mukundan et al. | 709/330 |
| 2003/0120875 A1 | 6/2003 | Bourne et al. | 711/144 |
| 2003/0149737 A1 | 8/2003 | Lambert et al. | 709/214 |
| 2003/0154412 A1 | 8/2003 | Hetzler et al. | 713/202 |
| 2003/0171991 A1 | 9/2003 | Robbins | 705/14 |
| 2004/0073604 A1 * | 4/2004 | Moriya et al. | 709/202 |

OTHER PUBLICATIONS

Inside Linux, by Michael Tobler Pub. Date: Oct. 17, 2000, p. 55.*

* cited by examiner

*Primary Examiner*—Matt Kim
*Assistant Examiner*—Kaushikkumar Patel
(74) *Attorney, Agent, or Firm*—DeLizio Gilliam, PLLC

(57) ABSTRACT

Embodiments include retrieving data of a web page from a remote system in response to a request for the web page. It is determined that the web page is indicated in a data structure that indicates web pages not to be cached in a cache of a web browser on a data processing system. The data structure and the cache of the web browser are distinct from each other. The web page is presented with the web browser using the data retrieved from the remote system. The data of the web page is prevented from being cached in the cache of the web browser in accordance with said determining that the web page is indicated in the data structure that indicates web pages not to be cached in the cache of the web browser on the data processing system.

12 Claims, 4 Drawing Sheets

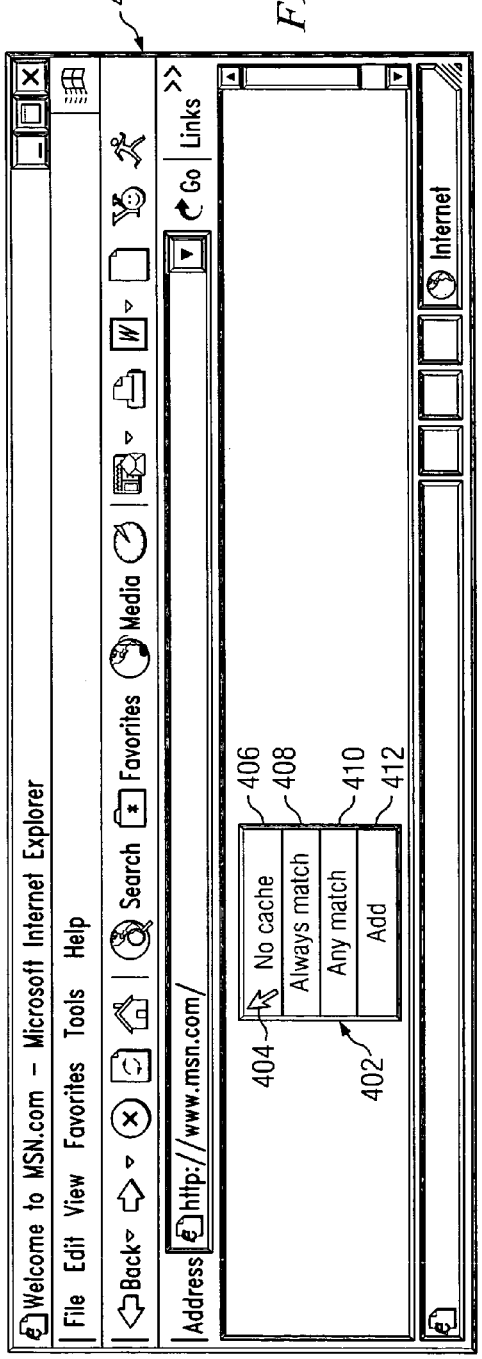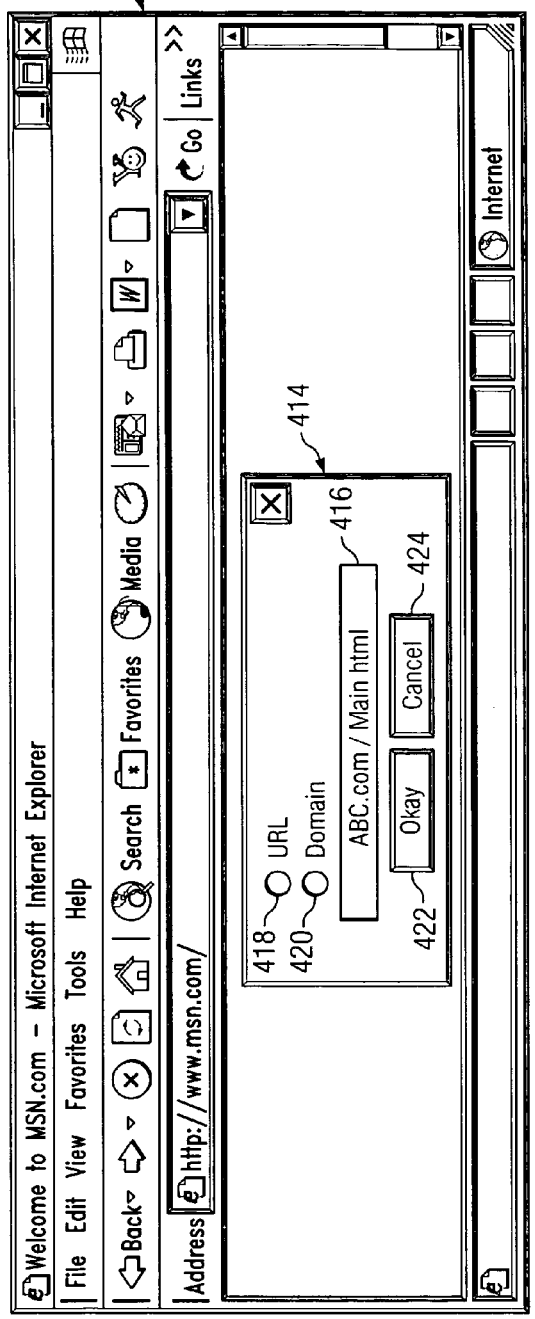
FIG. 4A
FIG. 4B

MANAGING CACHING OF DATA ON A CLIENT

BACKGROUND OF THE INVENTION

1. Technical Field

The present invention relates generally to an improved data processing system and in particular to a method and apparatus for processing data. Still more particularly, the present invention relates to a method, apparatus, and computer instructions for managing the caching of data by a browser on a client.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

Some of the features that provide a dynamic and adaptive nature for Web browsers used in surfing or browsing the Internet also are features that have high security concerns for individuals concerned about personal privacy. These features include cookies and page caching.

For example, when the user visits a credit card Website to view personal data, cookies and cached Web pages concerning the user's visit may be cached onto the hard drive of the computer being used. Subsequent visits to other Websites may encounter fraudulent or mischievous sites that may wish to view or steal personal data from the user's hard drive.

Some solutions for this issue include Web designers designing sites to prevent cookie or page caching to occur on the client computer. An example is a Java application that displays personal data in the application itself and not on the Web browser. Further, third-party plug-ins that flush all cookies and cache at set intervals also have been used. Additionally, one may manually set purge requests in the Web browser. One problem with programs providing for purging of sensitive data at set intervals or with the user manually purging data from the browser cache is that all of the data is purged. In some cases, such an event is undesirable. Further, in between events in which the browser cache is purged, a visit to a malicious Website may still result in the theft of personal or confidential data.

Therefore, it would be advantageous to have an improved method, apparatus, and computer instructions for managing the caching of data by a browser on a data processing system.

SUMMARY OF THE INVENTION

The present invention provides a method, apparatus, and computer instructions for managing caching of data by a browser. A request is received to retrieve a Web page. The request includes location information for the Web page. A determination is made as to whether a match is present in a data structure for the location information. In response to a match being present, the caching of data for the Web page is prevented or cached on a temporary basis.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A and 4B are diagrams illustrating a graphical user interface for managing the caching of data by a browser in accordance with a preferred embodiment of the present invention;

DETAILED DESCRIPTION OF THE PREFERRED EMBODIMENT

Figure 1:
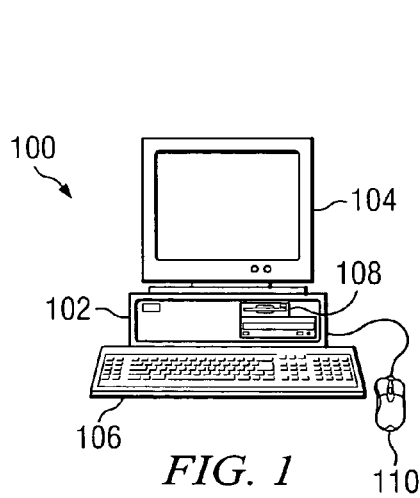
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
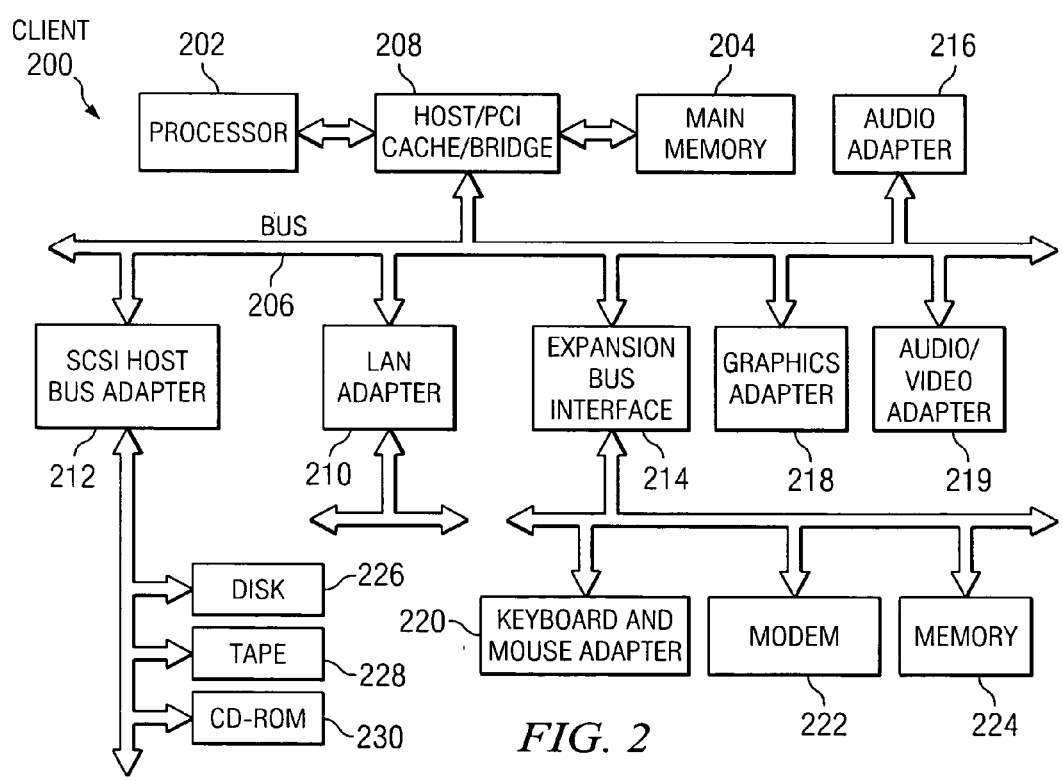
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides an improved method, apparatus, and computer instructions for selectively caching data by a browser. A browser is an application used to navigate or view information or data in a distributed database, such as the Internet or the World Wide Web. The mechanism of the present invention provides for selectively caching data for Web pages based on a URL or domain name for the Web page in the illustrative examples. The user may enter URLs or domain names that are stored as a list such that any references to links matching the URLs or domain names result in the Web page being displayed, but all cookies and cached pages are flushed or cleared from the data processing system without any caching occurring.

Depending on the options selected, if a match between a domain name or a particular URL and those in the list occurs, caching of data associated with a retrieved Web page is prevented. If a match does not occur, then caching occurs normally for the browser.

Figure 3:
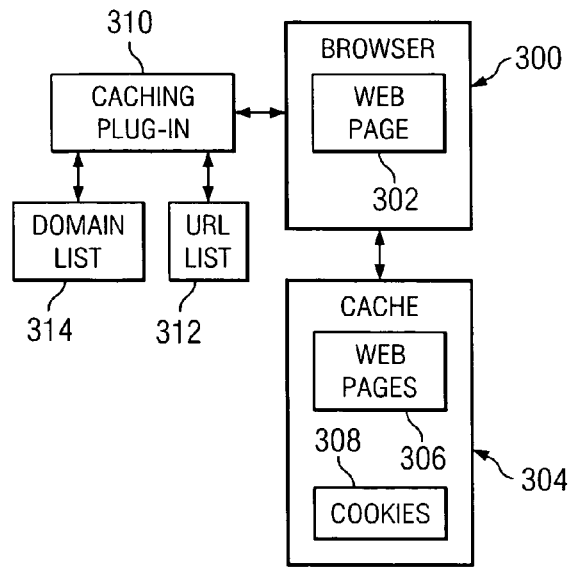
FIG. 3 is a diagram illustrating components used in managing the caching of data by a browser in accordance with a preferred embodiment of the present invention.

With reference now to FIG. 3, a diagram illustrating components used in managing the caching of data by a browser is depicted in accordance with a preferred embodiment of the present invention. In this illustrative example, browser 300 may retrieve Web pages, such as Web page 302, from various Websites on the Internet. Typically, browser 300 caches information within cache 304. This information includes previously retrieved Web pages, which may be stored in Web pages 306 and cookies received from various Websites which may be stored in cookies 308. Web page 302 is, for example, an HTML file which is displayed by browser 300 and is saved in cache 304 as a cache file. This cache file is typically named with a randomly generated unique identifier. For example, a file named MCFIHTML may be stored in cache 304 as cache3F266B4100113BA6.htm. This type of naming convention avoids conflict with other files that may have the same name. As a result, selectively flushing files by viewing the file names in cache 304 is difficult because of the naming convention.

Currently, a user may flush Web pages and cookies from cache 304 through selecting an Internet option provided through browser 300. Additionally, a user also may set browser 300 to prevent any caching of Web pages and acceptance of cookies in cache 304. The mechanism of the present invention adds additional features with respect to caching of data by browser 300. Specifically, the mechanism of the present invention allows for selective caching of data in cache 304 based on a domain name or URL for a retrieved Web page, such as Web page 302.

This selective caching process may be implemented in caching plug-in 310 in the illustrative examples. A plug-in is a program that is associated with browser 300 to provide for additional functionality. Typically, this additional functionality provides for audio, graphic, or video features. The mechanism of the present invention implements a selective caching process within caching plug-in 310 to control the manner in which data is cached in cache 304.

In the illustrative examples, caching plug-in 310 may prevent caching of data for any Web page. Additionally, an option for preventing caching of data based on specific URLs and domain names also may be set through caching plug-in 310. If a no cache option is selected, all caching of data within cache 304 is prevented when browser 300 retrieves Web pages. A selection of a URL match results in caching plug-in 310 preventing the caching of data within cache 304 if the URL for a retrieved Web page matches a URL within URL list 312. A selection to prevent caching based on domains results in caching plug-in 310 preventing the caching of data in cache 304 in response to the domain for Web page 302 matching a domain within domain list 314. Thereafter, Web page 302 is displayed on the screen for browser 300, but not saved to the disk with such a match. Instead, the data is cleared.

URL list 312 and domain list 314 may be maintained by caching plug-in 310 in a fashion similar to the manner in which browser 300 maintains a list of bookmarks. In the illustrative examples, the cookies and cache pages are sent to a "/dev/null" and thus flushed from the data processing system, rather than being cached or stored anywhere within the data processing system. This particular option causes the file to be presented on browser 300, but the actual file is written into a "/dev/null", which is a name used to refer to a "black hole" in operating systems. For example, instead of the file cache3F266B4100113BA6.htm being written into the standard cache directory, in cache 304, browser 300 writes the file to an alternative directory, rather than the standard cache directory. This type of file writing occurs when a URL or domain for a Web page is identified as being on URL list 312 or domain list 314.

Of course, other mechanisms may be used. One other mechanism is an "erase the next to last cache" mechanism, which causes the file to be named to a common cache name, rather than using a unique name. For example, instead of using the name cache3F266B4100113BA6.htm, a common cache name, such as delete_next.htm may be used. This name is used for every file. As a result, the next Web page from a URL or domain name on URL list 312 or domain name 314 is saved using delete_next.htm, causing the previously cached file to be erased.

Another option involves writing and then erasing the file for the Web page. When a do-not-cache URL or domain is detected, the Web page is displayed onto the browser. In this illustrative example, the file to be cached is saved as cache_short_life.htm. Then, after this file is written to the disk, the file is erased as the next action. This feature may be used in the instance in which a browser will not display or pull down Web pages unless the browser also can write to the cache. This mechanism allows the browser to write to the cache. With this mechanism, after this write-display by the browser finishes, the mechanism of the present invention erases the file in this particular embodiment.

In this manner, a user may save cached information for a site visited before and after the visit to the sensitive site. The user does not have to clear the entire cache to clear sensitive information from the disk cache. Further, this mechanism also avoids having a user to identify locations in which cookies and pages are cached and attempt to delete that information by trying to identify cookies or data associated with Web pages from a sensitive Website.

Turning now to FIGS. 4A and 4B, diagrams illustrating a graphical user interface for managing the caching of data by a browser is depicted in accordance with a preferred embodiment of the present invention. In FIG. 4A, browser window 400 is illustrated in which menu 402 is displayed in response to a selected user input, such as a right-click to a pointing device with pointer 404 being located within browser window 400.

Menu 402 includes the following options: "No cache" 406, "Always match" 408, "Any match" 410, and "Add" 412. "No cache" 406 results in preventing any data from being cached in response to the retrieval of Web pages from different Websites. A selection of "Always match" 408 means that if content is requested from a URL that exactly matches a URL listed in a URL list, then the content will be displayed, but data is not cached in the data processing system. Instead, the data is cleared from the data processing system.

A selection of "Any match" 410 results in a Web page being retrieved from a URL containing a match to a domain name listed within a domain list being displayed, but the data is not saved or cached. Instead, the data is cleared from the data processing system after the Web page is displayed on the browser screen.

In this manner, a user may selectively prevent caching of data from Websites that are considered to be sensitive. The user may identify these Websites by selecting "Add" 412. A selection of this option allows the user to enter domain names and URLs for sensitive Websites or Web pages that should not be cached.

In FIG. 4B, browser window 400 provides an option for entering URL and domain name information into lists for selectively caching data through window 414. This window is presented in response to a selection of "Add" 412 from menu 402, in FIG. 4A. In this illustrative example, a domain name or URL may be entered within text field 416. The user may add the domain name or URL to a URL list or domain list based on the selection of controls 418 and 420 respectively.

When the user is ready to add the entry, the user may select "Okay" button 422. If the user desires to cancel the entry, a selection of "Cancel" button 424 may be made from window 414. If control 418 is selected, the URL is entered into a URL list, such as URL list 312 in FIG. 3. The selection of control 420 results in the domain name entered into text field 416 being saved in a domain list, such as domain list 314 in FIG. 3.

Figure 5:
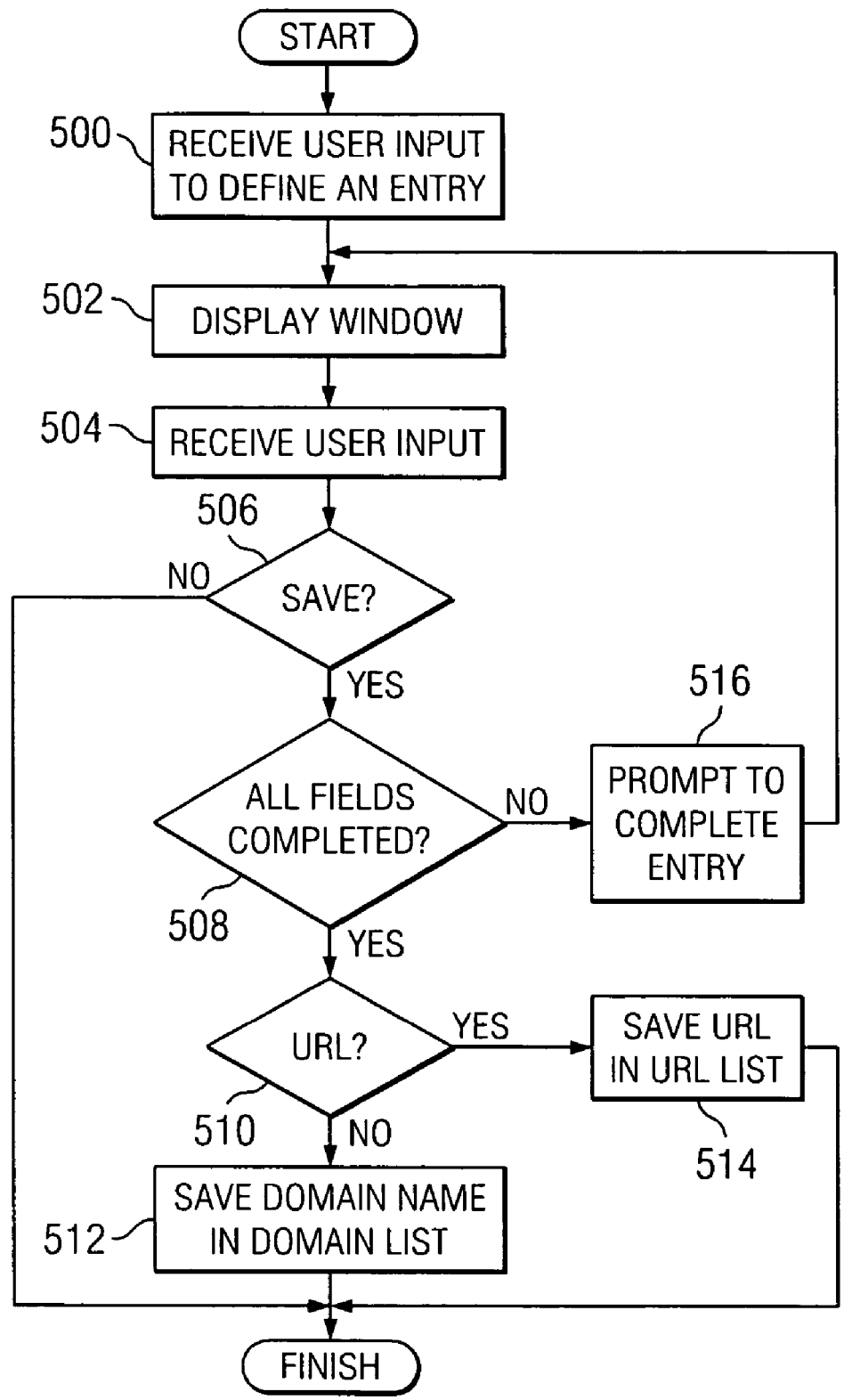
FIG. 5 is a flowchart of the process for defining URL and domain names in accordance with a preferred embodiment of the present invention.

With reference now to FIG. 5, a flowchart of the process for defining URL and domain names is depicted in accordance with a preferred embodiment of the present invention. The process illustrated in FIG. 5 may be implemented in a plug-in, such as caching plug-in 310 in FIG. 3.

The process begins by receiving a user input to define an entry in a list (step 500). This user input may be, for example, a selection of "Add" 412 in menu 402 in FIG. 4A. In response to receiving this user input, a window is displayed (step 502). This window provides an interface for a user to enter information for entry in a list. The window may be implemented using a window, such as window 414 in FIG. 4B.

Thereafter, user input is received (step 504). In step 504, the user input is a selection of a button indicating that entry into the window has been completed. A determination is made as to whether the user input is to save information from the window (step 506). In the illustrative example in FIG. 4B, the user input is to save data if "Okay" button 422 is selected. The user input is to cancel the operation or not save data if "Cancel" button 424 in FIG. 4B is selected. If data is to be saved, a determination is made as to whether all of the fields have been completed (step 508). If all of the fields have been completed, a determination is made as to whether the user has entered a URL for the entry (step 510).

If the user has not entered a URL, then the data is a domain name and the domain name is saved in a domain list (step 512) with the process terminating thereafter. Referring back to step 510, if the information entered by the user is a URL, then the URL is saved in a URL list (step 514) with the process terminating thereafter.

With reference again to step 506, if the user has decided not to save the data entered into the window, the process terminates. This termination of the process occurs without saving any data that may have been entered into the window. Turning back to step 508, if all of the fields have not been completed, a prompt to complete entry of the fields is made (step 516) with the process then returning to step 502 as described above.

Figure 6:
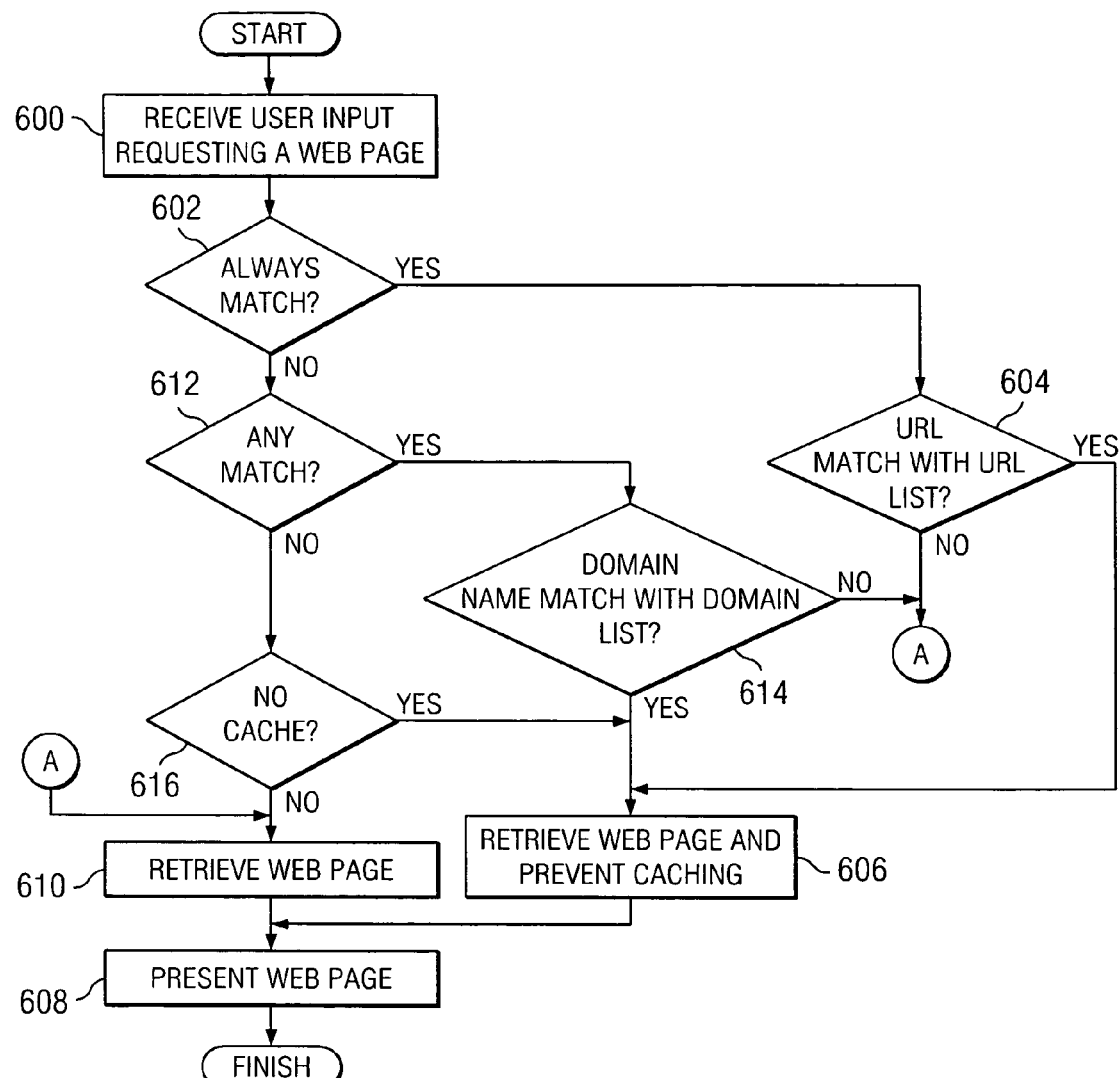
FIG. 6 is a flowchart of a process for managing caching of data by a browser in accordance with a preferred embodiment of the present invention.

With reference now to FIG. 6, a flowchart of a process for managing caching of data by a browser is depicted in accordance with a preferred embodiment of the present invention. The process illustrated in FIG. 6 may be implemented in a plug-in, such as caching plug-in 310 in FIG. 3.

The process begins by receiving a user input requesting a Web page (step 600). This request may be through a selection of a link or by a user entering a URL into an address field in the browser. A determination is made as to whether the user has selected an always match option (step 602). An always match option is one in which an exact match between the URL for the requested Web page and an entry in a URL list is required.

If the user has selected an always match option, a determination is made as to whether the URL for the Web page has a match with an entry in the URL list (step 604). If a match is present, the Web page is retrieved and caching is prevented with this retrieval (step 606). Thereafter, the Web page is presented (step 608).

With reference again to step 604, if the URL does not match, then the Web page is retrieved (step 610) with the process then proceeding to step 608 as described above. In this case, caching of information for the Web page is not prevented.

With reference again to step 602, if an always match option has not been selected, a determination is made as to whether an any match option has been selected (step 612). If an any match option has been selected, a determination is made as to whether the domain name in the URL for the Web page matches an entry within a domain list (step 614). If a match is present, the process proceeds to step 606 as described above. Otherwise, the process retrieves the Web page without preventing caching of information as described in step 610.

With reference again to step 612, if an any match option has not been selected, a determination is made as to whether a no cache option has been selected (step 616). If a no cache option has been selected, the process proceeds to step 606 as described above. Otherwise, the process proceeds to step 610 to retrieve the Web page with normal caching occurring.

Caching may be prevented in a number of different ways depending on the particular implementation. In the illustrative examples, caching is prevented by directing data for the Web page to a "/dev/null" causing the data to be flushed from the data processing system. In this illustrative embodiment, the data is not stored for the Web page. Instead, data is sent to the graphics adapter or other adapters for presentation to the user. Otherwise, data is not saved to the hard disk or stored in a buffer or memory for later use. As a result, if the user selects a different Web page and wishes to return to the previous Web page, all information has to be retrieved from the Website. In an alternative embodiment, data may be temporarily cached in a memory in which this data is flushed as soon as the user retrieves another Web page.

Thus, the present invention provides an improved method, apparatus, and computer instructions for managing the caching of data associated with Web pages. The mechanism of the present invention allows a user to enter URLs or domain names that are stored by a browser or plug-in associated with the browser. As a result, any reference or selection of Web pages matching the URLs or domain names will result in those Web pages being displayed on the browser screen. However, all cookies, cached pages, and other information associated with these entries are flushed from the data processing system and not saved within a browser cache or any other cache in the data processing system.

In the illustrative examples, the caching control allows for the prevention of any caching to occur. The other additional options include requiring an exact match to a URL or requiring a match to a domain name. Further, the mechanism of the present invention also may be applied to a match to any text that is entered. For example, if the user enters "ABC", then any URL containing the string "ABC" will initiate a process to prevent caching of data for that page. As a result, the user may enter a stream that may be part of a URL or part of a domain name and prevent caching of data for any Web pages containing that string in the URL.

Thus, the user may save cached information for non-sensitive sites, while information for sensitive sites is cleared from the data processing system. This mechanism avoids the user having to clear the cache of all information. Further, this mechanism avoids a user having to manually search folders for information associated with a sensitive site and having to manually delete files containing sensitive data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
retrieving data of a web page from a remote system in response to a request for the web page;
determining that the web page is indicated in a data structure that indicates web pages not to be cached in a cache of a web browser on a data processing system, wherein the data structure and the cache of the web browser are distinct from each other;
presenting the web page with the web browser using the data retrieved from the remote system; and
preventing the data of the web page from being cached in the cache of the web browser in accordance with said determining that the web page is indicated in the data structure that indicates web pages not to be cached in the cache of the web browser on the data processing system;
wherein said preventing the data of the web page from being cached in the cache of the web browser in accordance with said determining that the web page is indicated in the data structure that indicates web pages not to be cached in the cache of the web browser on the data processing system comprises writing the data of the web page to a file in the cache of the web browser; and overwriting the data of the web page in the file with data of a next retrieved web page.

2. The method of claim 1, wherein determining that the web page is indicated in the data structure that indicates web pages not to be cached in the cache of the web browser on the data processing system comprises determining that a uniform resource locator of the web page is specified in the data structure.

3. The method of claim 1, wherein determining that the web page is indicated in the data structure that indicates web pages not to be cached in the cache of the web browser on the data processing system comprises determining that a domain name corresponding to the web page is specified in the data structure.

4. The method of claim 1 further comprising invoking a caching plug-in associated with the web browser, wherein the caching plug-in performs said determining that the web page is indicated in the data structure that indicates web pages not to be cached in the cache of the web browser on the data processing system and performs said preventing the data of the web page from being cached in the cache of the web browser in accordance with said determining that the web page is indicated in the data structure that indicates web pages not to be cached in the cache of the web browser on the data processing system.

5. The method of claim 1, further comprising:
retrieving the data of the next retrieved web page from the remote system in response to a request for the next retrieved web page; and
determining that the next retrieved web page is indicated in the data structure.

6. The method of claim 1, wherein the data of the web page comprises cookies.

7. The method of claim 1, wherein the data structures comprises a list of domain names and a list of uniform resource locators.

8. A method comprising:
retrieving data of a web page from a remote system in response to a request for the web page;
determining that the web page is indicated in a data structure that indicates web pages not to be cached in a cache of a web browser on a data processing system, wherein the data structure and the cache of the web browser are distinct from each other;
presenting the web page with the web browser using the data retrieved from the remote system; and
preventing the data of the web page from being cached in the cache of the web browser in accordance with said determining that the web page is indicated in the data structure that indicates web pages not to be cached in the cache of the web browser on the data processing system,
wherein said preventing the data of the web page from being cached in the cache of the web browser in accordance with said determining that the web page is indicated in the data structure that indicates web pages not to be cached in the cache of the web browser on the data processing system comprises,
writing the data of the web page to a file in the cache of the web browser; and
erasing the file incident to writing of the data of the web page to disk space that is distinct from the cache of the browser.

9. A recordable-type of computer readable medium comprising:
program code configured to,
determine that a web page is indicated in a data structure that indicates web pages not to be cached in a cache of a web browser on a data processing system, wherein the data structure and the cache of the web browser are distinct from each other and wherein data of the web page was retrieved from a remote system responsive to a request for the web page by the data processing system, and
prevent the data of the web page from being cached in the cache of the web browser based on determining that the web page is indicated in the data structure that indicates web pages not to be cached in the cache of the web browser on the data processing system,
wherein the program code being configured to prevent the data of the web page from being cached in the cache of the web browser based on determining that the web page is indicated in the data structure that indicates web pages not to be cached in the cache of the web browser on the data processing system comprises the program code being configured to, write the data of the web page to a file in the cache of the web browser; and
overwrite the data of the web page in the file with data of a next retrieved web page.

10. The recordable-type of computer readable medium of claim 9, wherein a web browser plug-in comprises the program code.

11. The recordable-type of computer readable medium of claim 10, wherein the plug-in is configured to prevent the web browser from caching the web page in the cache of the web browser.

12. A data processing system comprising:
a processor;

a browser cache;

a recordable-type of computer readable medium that embodies a web browser and a caching plug-in associated with the web browser, the web browser configured to retrieve data of a web page from a remote system responsive to the data processing system requesting the web page and to present the web page at the data processing system using the data of the web page retrieved from the remote system, and the caching plug-in configured to, determine that the web page is indicated in a data structure that indicates web pages not to be cached in the browser cache, wherein the data structure and the browser cache are distinct from each other, and prevent the data of the web page from being cached in the browser cache based on determining that the web page is indicated in the data structure that indicates web pages not to be cached in the browser cache, wherein the caching plug-in being configured to prevent the data of the web page from being cached in the cache of the web browser based on determining that the web page is indicated in the data structure that indicates web pages not to be cached in the cache of the web browser on the data processing system comprises the caching plug-in being configured to, write the data of the web page to a file in the cache of the web browser; and overwrite the data of the web page in the file with data of a next retrieved web page.

* * * * *